United States Patent
Iwatani

(10) Patent No.: US 12,410,643 B2
(45) Date of Patent: Sep. 9, 2025

(54) DOOR LOCK ASSEMBLY

(71) Applicant: TOYOTA BOSHOKU KABUSHIKI KAISHA, Aichi-ken (JP)

(72) Inventor: Toshinori Iwatani, Mie-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 128 days.

(21) Appl. No.: 18/234,566

(22) Filed: Aug. 16, 2023

(65) Prior Publication Data
US 2024/0093540 A1   Mar. 21, 2024

(30) Foreign Application Priority Data

Sep. 20, 2022   (JP) .................. 2022-148750

(51) Int. Cl.
*E05B 85/08*   (2014.01)
*E05B 79/02*   (2014.01)

(52) U.S. Cl.
CPC .............. *E05B 85/08* (2013.01); *E05B 79/02* (2013.01)

(58) Field of Classification Search
CPC ........ E05B 85/08; E05B 85/085; E05B 79/00; E05B 79/02; E05B 79/06; E05B 79/22; E05B 1/00; E05B 1/0038; E05B 1/0046; B60R 13/0243
USPC ..................................................... 296/146.7
See application file for complete search history.

(56) References Cited

U.S. PATENT DOCUMENTS

| | | | | |
|---|---|---|---|---|
| 2004/0026936 A1* | 2/2004 | Slovesko | ............... | E05B 83/36 |
| | | | | 292/336.3 |
| 2019/0106913 A1* | 4/2019 | Fukuchi | .................. | E05B 79/22 |
| 2019/0309546 A1* | 10/2019 | Kawamoto | ............ | E05B 79/04 |

FOREIGN PATENT DOCUMENTS

| | | | |
|---|---|---|---|
| JP | H07-48964 A | | 2/1995 |
| JP | 2021169702 A | * | 10/2021 |
| JP | 2021187386 A | * | 12/2021 |

* cited by examiner

*Primary Examiner* — Christine M Mills
*Assistant Examiner* — Yahya Sidky
(74) *Attorney, Agent, or Firm* — Greenblum & Bernstein, P.L.C.

(57) ABSTRACT

A door lock assembly includes a door trim including a through hole, and a locking device that is disposed on a vehicular exterior side with respect to the door trim and locks and unlocks a vehicular door. The locking device includes a lock knob holder and a door lock knob. The lock knob holder has a tubular shape and two holes at two opposite ends and one of the two holes is adjacent to the through hole and another one is an insertion hole. The door lock knob has a bar shape and is disposed in the lock knob holder so as to be movable between an unlocked position and a locked position. The door lock assembly further includes an insertion guide portion disposed adjacent to the insertion hole and includes a guide surface having a width that increases as it extends away from the insertion hole.

12 Claims, 7 Drawing Sheets

FIG.1
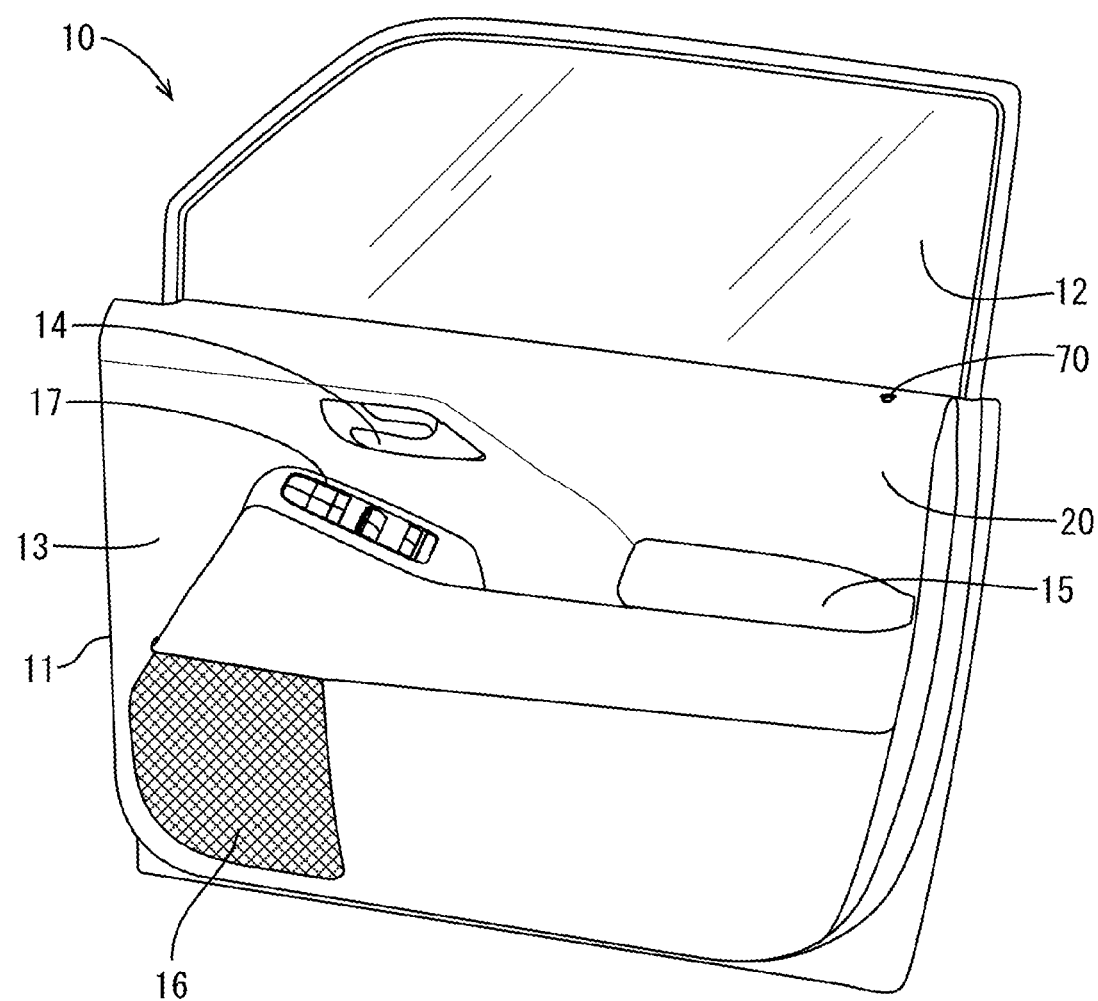
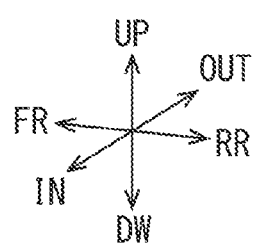

DOOR LOCK ASSEMBLY

CROSS REFERENCE TO RELATED APPLICATION

This application claims priority from Japanese Patent Application No. 2022-148750 filed on Sep. 20, 2022. The entire contents of the priority application are incorporated herein by reference.

TECHNICAL FIELD

The present technology described herein relates to a door lock assembly.

BACKGROUND

A vehicular door of an automobile generally includes a locking device that locks and unlocks a door. Such a locking device includes a door lock knob on a vehicular interior side. The door lock knob is used for performing the locking operation. For example, a bar-shaped door lock knob projects from a hole in the door trim. Such a door lock knob is held in a tubular holder that is disposed on the vehicular exterior surface side with respect to the door trim.

SUMMARY

To mount the bar-shaped door lock knob in the tubular holder, the top end of the door lock knob is moved closer to a hole of the holder and the door lock knob is inserted in the holder. The opening size of the hole of the holder is not much different from a diameter of the door lock knob. Therefore, positioning of the door lock knob with respect to the hole is not easy and needs to be performed several times to mount the door lock knob in the holder properly.

An object of the present technology described herein is to provide a door lock assembly with which a door lock knob and a lock knob holder can be fitted together easily.

To solve the above problems, a door lock assembly according to the technology described herein includes a door trim including a through hole and a locking device that is disposed on a vehicular exterior side with respect to the door trim and locks and unlocks a vehicular door. The locking device includes a lock knob holder and a door lock knob. The lock knob holder has a tubular shape and two holes at two opposite ends. One of the two holes is adjacent to the through hole and another one of the two holes is an insertion hole. The door lock knob has a bar shape and is disposed in the lock knob holder so as to be movable between an unlocked position at which the door lock knob projects upward from a vehicular interior side surface of the door trim through the through hole and a locked position at which the door lock knob is positioned lower than the unlocked position. The door lock assembly further includes an insertion guide portion that is disposed adjacent to the insertion hole and includes a guide surface having a width that increases as it extends away from the insertion hole.

BRIEF DESCRIPTION OF THE DRAWINGS

FIG. 1 is a perspective view of a vehicular door including a door lock assembly according to one embodiment.

DETAILED DESCRIPTION

Figure 2:
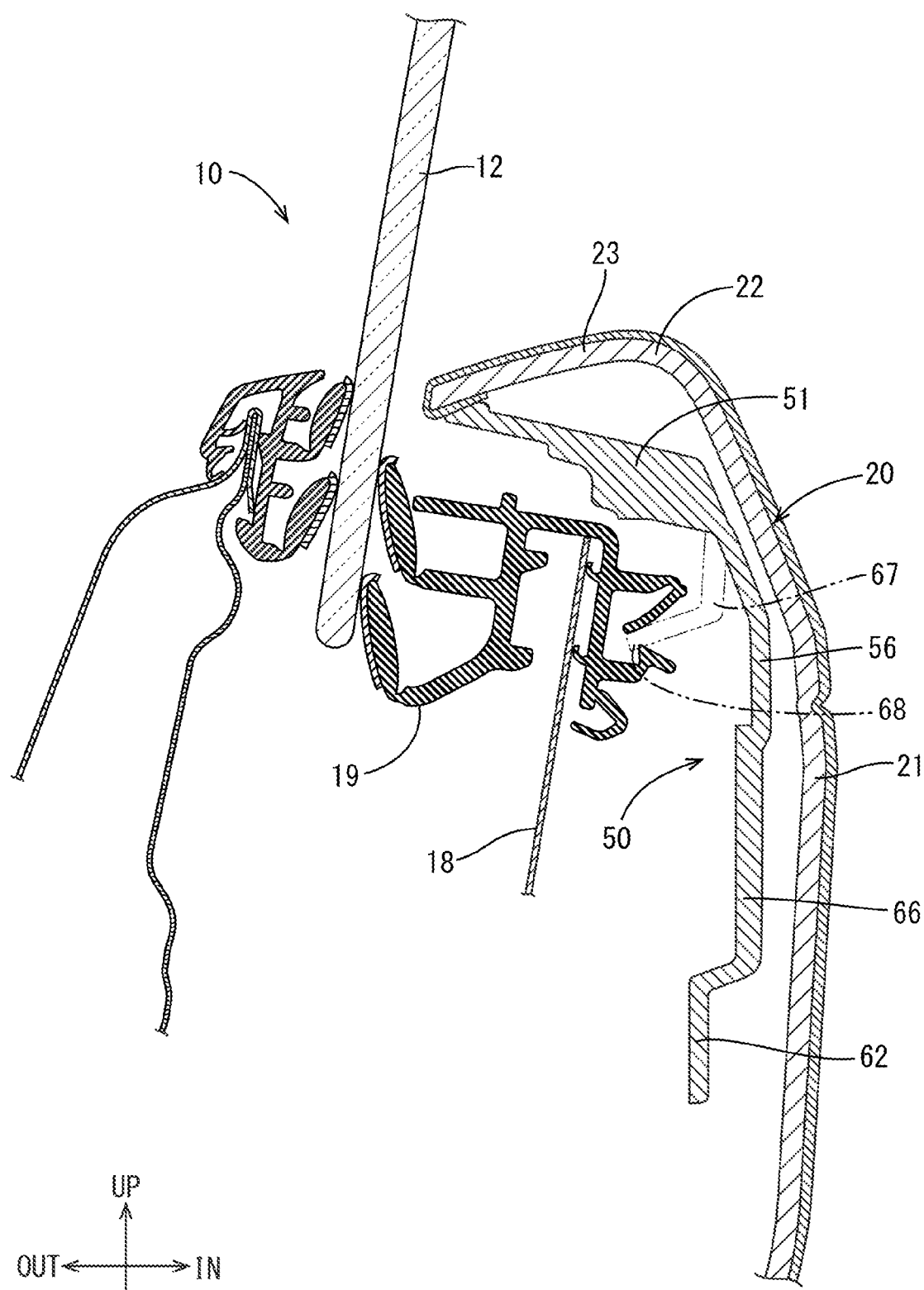
FIG. 2 is a cross-sectional view illustrating a cross-sectional configuration of a portion of the vehicular door including an upper cover and a weather strip.

A door lock assembly 1 according to one embodiment will be described with reference to FIGS. 1 to 7. The door lock assembly 1 is for mounting a door lock knob 71 in a lock knob holder 80 that is disposed on a vehicular exterior side with respect to a door trim 11. The door trim 11 is configured as a vehicular interior side surface of a vehicular door 10.

The door trim 11 is disposed below a side window 12 (one example of a window) of the vehicular door 10 and is mounted on a vehicular interior side with respect to a door inner panel 18. As illustrated in FIG. 1, the door trim 11 mainly includes a trim board 13 and further includes various components such as an inside handle 14, an armrest 15, a speaker grill 16, a switch device 17, and a locking device 70 that are mounted on the trim board 13. In each drawing, the arrows of FR and RR represent a vehicular front side and a vehicular rear side, respectively, and the arrows of UP and DW represent an upper side and a lower side, respectively, and the arrows IN and OUT represent a vehicular interior side and a vehicular exterior side, respectively.

The trim board 13 includes multiple board members that are joined together. An upper portion of the trim board 13 that is continuous to the side window 12 is an upper board 20. As illustrated in FIG. 2, the upper board 20 includes a side wall 21, a curved portion 22, and an upper wall 23. The side wall 21 is configured as a portion of the vehicular interior side surface of the vehicular door 10 and extends in an entire area of the vehicular door 10 with respect to the front-rear direction. The curved portion 22 extends from an upper edge of the side wall 21 to the upper wall 23 toward the vehicular exterior side with being curved. The upper wall 23 is configured as a portion of an upper surface of the vehicular door 10. The curved portion 22 is curved such that an angle formed by the side wall 21 and the upper wall 23 is (an acute angle) slightly smaller than a right angle. As illustrated in FIG. 1, the side wall 21 of the upper board 20 becomes wider as it extends rearward from a middle with respect to the front-rear direction.

The locking device 70 is mounted in a rear edge section of the upper board 20. The locking device 70 is for locking and unlocking the vehicular door 10.

Figure 3:
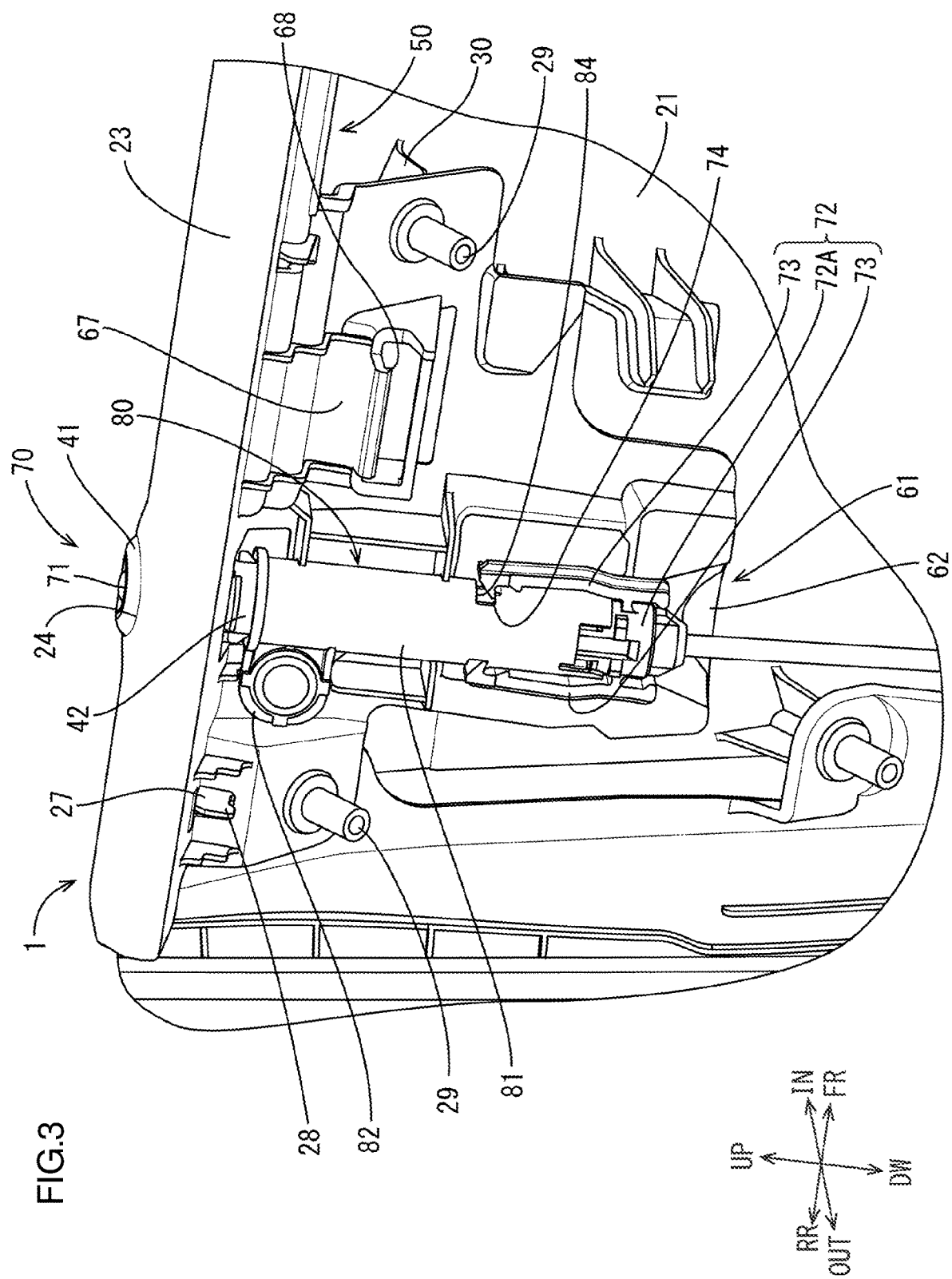
FIG. 3 is a perspective view illustrating a portion of a door trim including a locking device seen from a vehicular exterior side.
Figure 7:
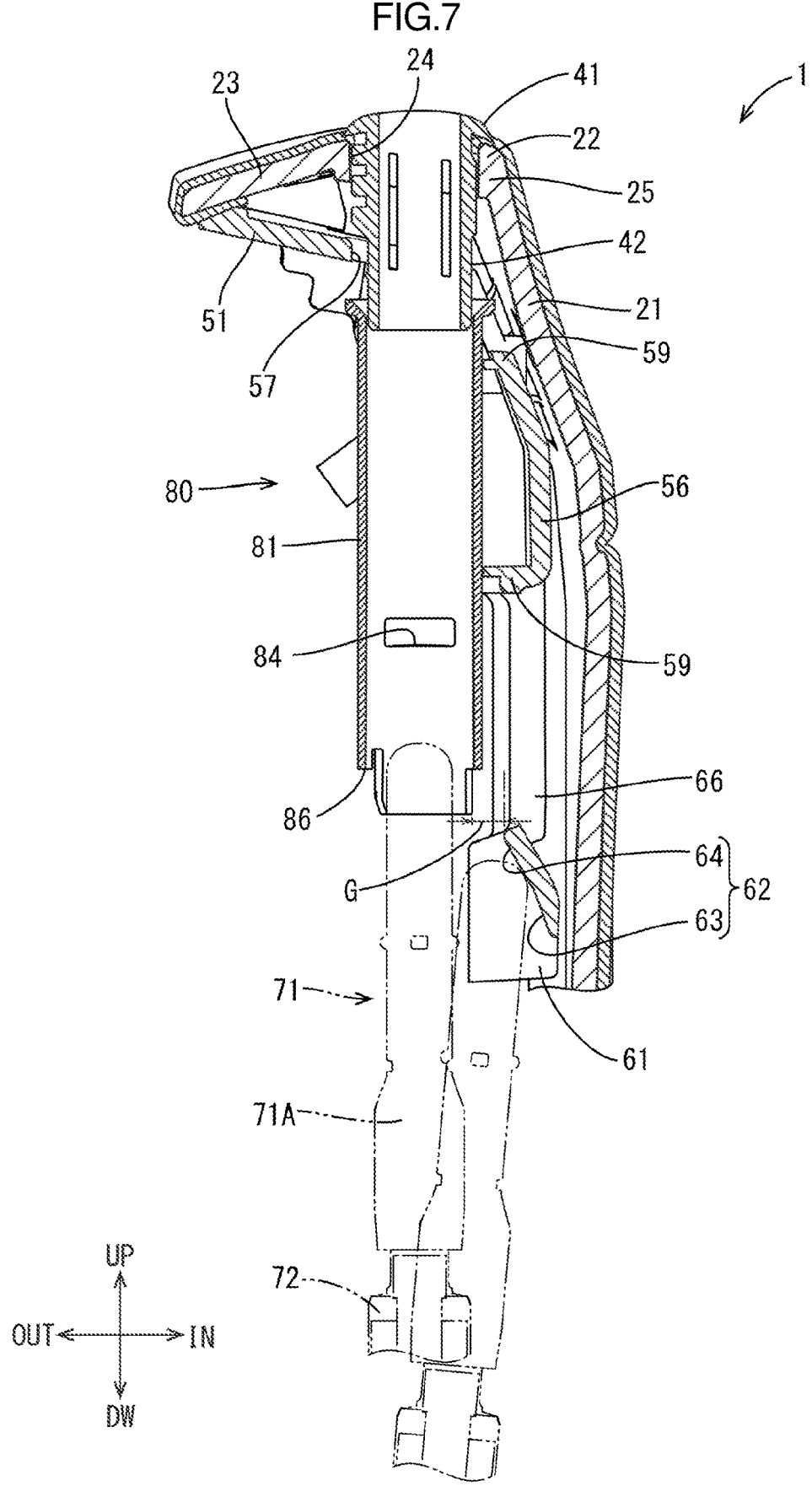
FIG. 7 is a cross-sectional view along I-I line in FIG. 5.

As illustrated in FIGS. 3 and 7, the locking device 70 includes a lock knob bezel 40, the door lock knob 71 having a circular bar shape as a whole, and the lock knob holder 80. The lock knob holder 80 has a tubular shape and is disposed on the vehicular exterior side with respect to the door trim 11 (the upper board 20). A knob body 71A of the door lock knob 71 is inserted in the lock knob bezel 40 and the lock knob holder 80 so as to be movable inside the lock knob bezel 40 and the lock knob holder 80. The upper board 20 includes a board-side through hole 24 in the rear section of the upper wall 23. The board-side through hole 24 is a circular hole. With the knob body 71A of the door lock knob 71 being inserted in the lock knob bezel 40 and the lock knob holder 80 and projecting upward through the board-side through hole 24, the vehicular door 10 is in an unlocked state. With the door lock knob 71 being lower than the board-side through hole 24 as illustrated in FIG. 3, the vehicular door 10 is in a locked state.

Figure 5:
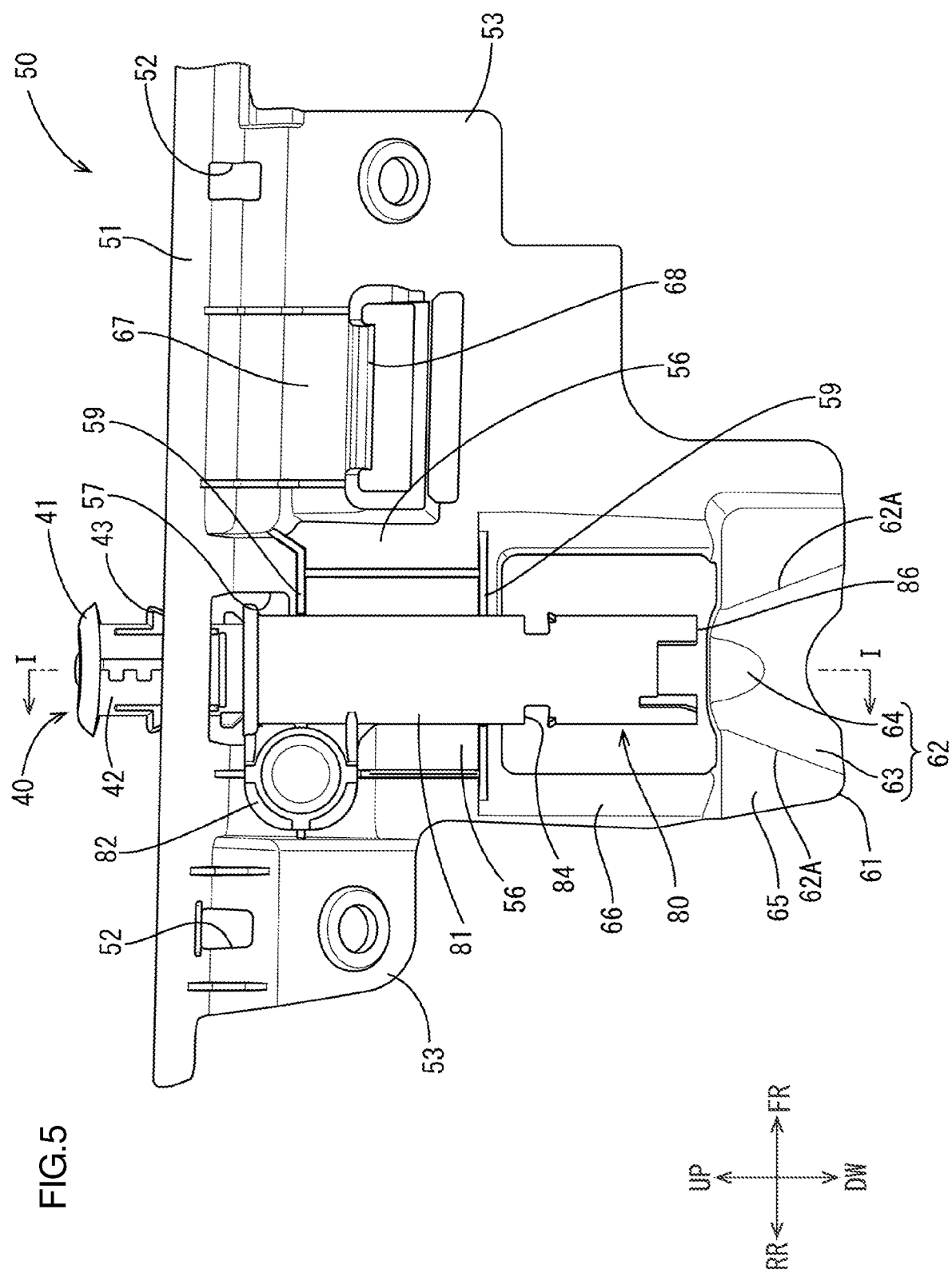
FIG. 5 is an elevation view of the upper cover including the lock knob holder.

As illustrated in FIGS. 3 and 7, the lock knob bezel 40 is mounted in the board-side through hole 24. The lock knob bezel 40 includes a bezel portion 41 and an insertion portion 42. The bezel portion 41 has a circular ring shape that surrounds a hole edge of the board-side through hole 24 and is disposed on an upper surface (a design surface) of the upper wall 23 of the upper board 20. The outer diameter of the bezel portion 41 is greater than an opening diameter of the board-side through hole 24 and greater than the outer diameter of the insertion portion 42. The insertion portion 42 has a tubular shape and extends from the bezel portion 41 and is inserted through the board-side through hole 24. As illustrated in FIG. 5, the insertion portion 42 includes stopper projections 43 that project outwardly from an outer surface of the insertion portion 42. The stopper projections 43 are on a middle of the insertion portion 42 with respect to an axial direction thereof. As illustrated in FIG. 7, the upper board 20 includes a base seat 25 on a vehicular exterior side surface of the hole edge of the board-side through hole 24. With the stopper projections 43 being stopped by the base seat 25, the lock knob bezel 40 is fixed to the upper board 20. The insertion portion 42 includes a mating portion on an opposite end from the bezel portion 41. The mating portion is to be mated with the lock knob holder 80.

The lock knob holder 80 is mounted on the upper board 20 via an upper cover 50 (one example of an intervening member). The upper cover 50 will be described below.

Figure 4:
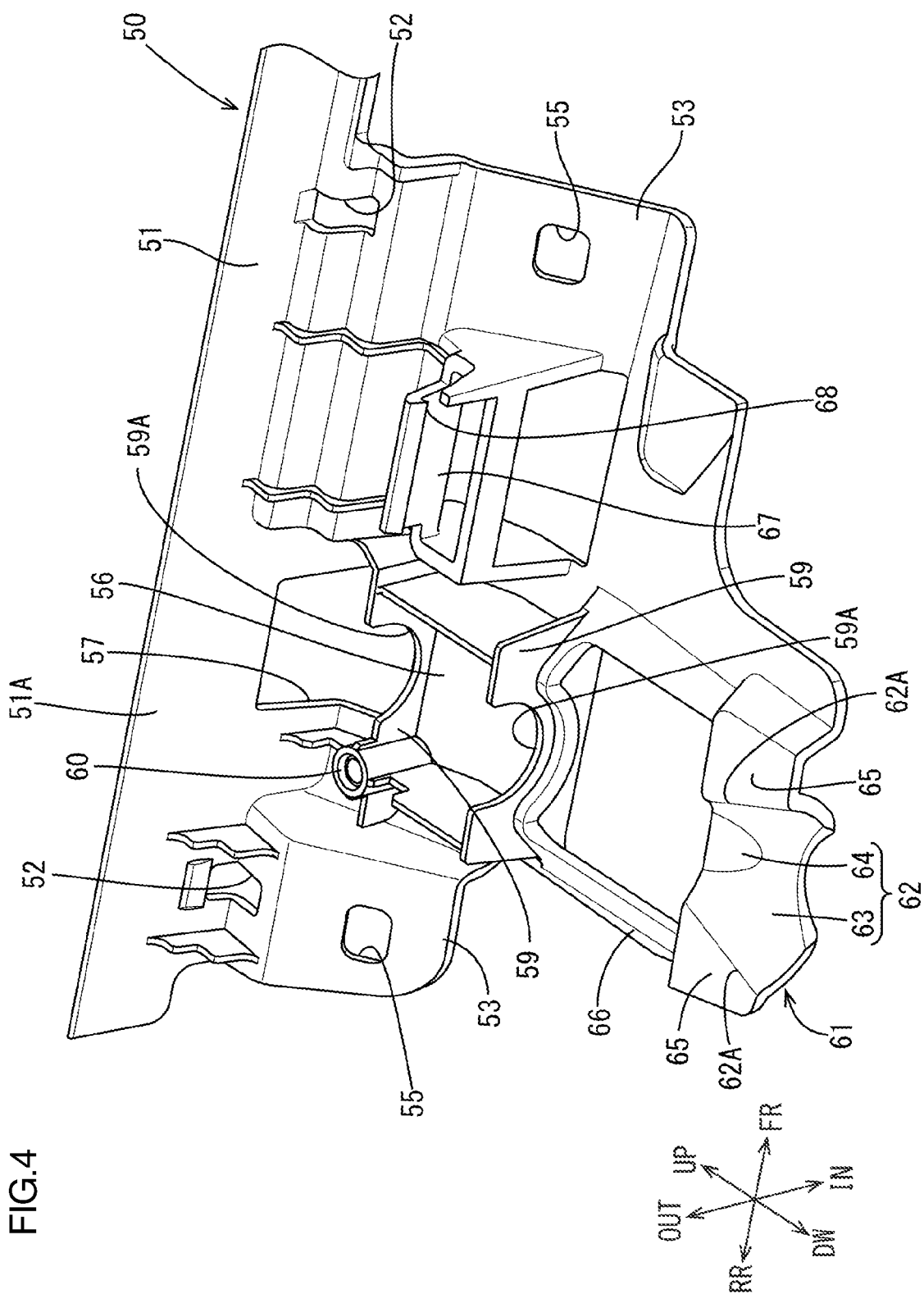
FIG. 4 is a perspective view of the upper cover.

As illustrated in FIG. 2, the upper cover 50 is mounted on the vehicular exterior side with respect to the upper board 20. The upper cover 50 includes a cover body 51 having a plate shape. As illustrated in FIGS. 2 and 4, the cover body 51 extends from a vehicular exterior side edge of the upper wall 23 of the upper board 20 along the curved portion 22 and extends downward along the side wall 21 of the upper board 20. The cover body 51 also extends in the front-rear direction. As illustrated in FIG. 3, the upper board 20 includes projection walls 27 that project from the vehicular exterior side surface of the upper board 20. The projection walls 27 are spaced from each other in the extending direction of the curved portion 22 (in the front-rear direction). The projection walls 27 have a rectangular plate shape extending from the upper wall 23 to the side wall 21. The projection wall 27 includes a positioning projection 28 that projects toward the vehicular exterior side from a corner of the projection wall 27 that is farthest from the curved portion 22. As illustrated in FIG. 4, the cover body 51 of the upper cover 50 includes positioning holes 52 corresponding to the positioning projections 28 of the upper board 20. With the positioning projections 28 being fitted in the positioning holes 52, respectively, the cover body 51 is positioned with respect to the upper board 20.

The upper board 20 includes fixing members 29 that have a tubular shape and project from the vehicular exterior side surface of the side wall 21. The fixing members 29 are disposed below the curved portion 22. As illustrated in FIG. 3, reinforcement ribs 30 having a rectangular plate shape extend radially from a basal portion of each fixing member 29.

As illustrated in FIG. 4, the upper cover 50 includes mount bases 53 in portions of the cover body 51 corresponding to the respective fixing members 29. The mount base 53 includes fixing member through holes 55 through which the fixing members 29 are inserted, respectively. A vehicular interior side surface of the mount base 53 is to be contacted with vehicular exterior end surfaces of the reinforcement ribs 30 when the fixing members 29 are inserted through the fixing member through holes 55. The mount base 53 is supported by the vehicular exterior end surfaces of the reinforcement ribs 30 from the vehicular interior side. With the fixing members 29 being inserted through the respective fixing member through holes 55 and thermally welded, the upper cover 50 is fixed to the upper board 20.

As illustrated in FIGS. 2 and 4, the cover body 51 of the upper cover 50 includes stopper pieces 67 that are arranged at intervals in the extending direction of the cover body (the front-rear direction). The stopper pieces 67 extend downward from a curved portion of the cover body 51 and are bent toward the vehicular exterior side and have an L-shape. The stopper pieces 67 include stopper portions 68 that project downward from distal ends thereof. As illustrated in FIG. 2, the vehicular door 10 includes the weather strip 19 for waterproofing between the side window 12 and the upper board 20 with respect to a vehicular interior-exterior direction (a vehicular width direction). With the stopper portions 68 of the stopper pieces 67 being held by the weather strip 19, the waterproofing between the upper board 20 and the side window 12 is achieved.

In this embodiment, the lock knob holder 80 is mounted on the upper board 20 via the upper cover 50. As illustrated in FIGS. 3 and 5, the lock knob holder 80 includes a tubular holder body 81 and a fixing portion 82. The fixing portion 82 projects from a one end portion (an upper portion in FIGS. 3 and 5) of the holder body 81 in a direction crossing an axial direction of the holder body 81. The fixing portion 82 has a plate surface that extends in the axial direction of the holder body 81. The fixing portion 82 includes a holder through hole that is through in a direction (the vehicular interior-exterior direction) perpendicular to the axial direction (the upper-bottom direction) of the holder body 81. The holder body 81 includes a pair of stopper holes 84 that are opposite each other with respect to the axis of the holder body 81. The stopper holes 84 are in a portion of the holder body 81 closer to another end (a lower end in FIGS. 3 and 5) of the holder body 81. One of the stopper holes 84 is on the same side (the left side in FIG. 5) as the fixing portion 82 is with respect to the axis of the holder body 81.

As illustrated in FIG. 7, the knob body 71A of the door lock knob 71, which has a columnar bar shape, is fitted in the lock knob holder 80 from a lower side. As illustrated in FIG. 3, the door lock knob 71 includes a mount member 72 on an end (a lower portion in FIG. 3) of the knob body 71A and the knob body 71A is fitted in the lock knob holder 80 so as to be movable along the axial direction of the door lock knob 71 and the lock knob holder 80. The mount member 72 includes a mount body 72A and a pair of arms 73 that radially project outward from the mount body 72A in opposite directions and extend upward. The arms 73 are opposite each other. The arms 73 include stopper projections 74 at extending ends thereof. The stopper projections 74 project inwardly. With the stopper projections 74 being fitted in the stopper holes 84 in the lock knob holder 80, the mount member 72 is held by the lock knob holder 80. The door lock knob 71 is held by the lock knob holder 80 so as to be movable with respect to the lock knob holder 80.

The holder body 81 of the lock knob holder 80 includes a mating recess in an inner peripheral surface of the one end side portion that includes the fixing portion 82. The mating portion of the lock knob bezel 40 is mated with the mating recess. With the mating portion being mated with the mating recess, the lock knob holder 80 is connected to the lock knob bezel 40.

As illustrated in FIGS. 4 and 7, the cover body 51 of the upper cover 50 includes an extending portion 56 in an area of the cover body 51 that extends in the front-rear direction corresponding to the board-side through hole 24 in the upper board 20 and also extends in the upper-bottom direction. The extending portion 56 is opposite the holder body 81 and extends along the side wall 21 of the upper board 20 with being away from the side wall 21.

The upper cover 50 includes a cover-side through hole 57. The insertion portion 42 of the lock knob bezel 40 that is inserted through the board-side through hole 24 in the upper board 20 is inserted through the cover-side through hole 57. The cover-side through hole 57 is in a cover upper portion 51A of the cover body 51 and extends horizontally in the vehicular interior-exterior direction (the vehicular width direction) and the front-rear direction and extends to the extending portion 56. Namely, the cover-side through hole 57 is formed by cutting off a corner formed between the cover upper portion 51. A and the extending portion 56. As illustrated in FIG. 7, with the insertion portion 42 of the lock knob bezel 40 that is mounted in the upper board 20 being inserted through the cover-side through hole 57, the insertion portion 42 is exposed on the vehicular exterior side with respect to the upper cover 50. The lock knob holder 80 is connected to the insertion portion 42 that is exposed on the vehicular exterior side and is disposed on the vehicular exterior side with respect to the upper board 20.

As illustrated in FIG. 4, support bases 59 project from the extending portion 56 toward the vehicular exterior side. As illustrated in FIG. 7, the support bases 59 are adjacent to the cover-side through hole 57 and support the lock knob holder 80 from the vehicular interior side. Two support bases 59 are disposed spaced from each other in the axial direction (the upper-bottom direction) of the lock knob holder 80 and include arched recessed portions 59A.

As illustrated in FIG. 4, a holder fixing portion 60 having a tubular shape projects from the extending portion 56 toward the vehicular exterior side. The holder fixing portion 60 is adjacent to one of the support bases 59. With the holder body 81 being fitted in the recessed portions 59A of the support bases 59 and the fixing portion 82 being fixed to the holder fixing portion 60, the lock knob holder 80 is fixed to the upper cover 50. With such a configuration, the lock knob holder 80 is disposed to extend along the side wall 21 of the upper board 20 with being away from the side wall 21 and away from the extending portion 56 of the upper cover 50 as illustrated in FIG. 7.

As illustrated in FIGS. 4 and 5, the upper cover 50 includes an insertion guide portion 61 that extends downward from the cover body 51. The insertion guide portion 61 is adjacent to the insertion hole 86 of the lock knob holder 80. The lock knob holder 80 extends in the upper-bottom direction and has two holes at two ends. An upper hole of the two holes is adjacent to the board-side through hole 24 and a lower hole of the two holes is an insertion hole 86. The insertion hole 86 opens downward. The insertion hole 86 is at an end of the lock knob holder 80 that is an opposite end from the end close to the board-side through hole 24 of the upper board 20. As illustrated in FIG. 7, the insertion guide portion is disposed between the side wall 21 of the upper board 20 and the lock knob holder 80. As illustrated in FIGS. 3 to 7, the insertion guide portion 61 includes a guide surface 62. The guide surface 62 has a width that increases as it extends farther away from the insertion hole 86 of the lock knob holder 80. The guide surface 62 is inclined so as to approach the insertion hole 86 as the guide surface 62 extends upward.

Figure 6:
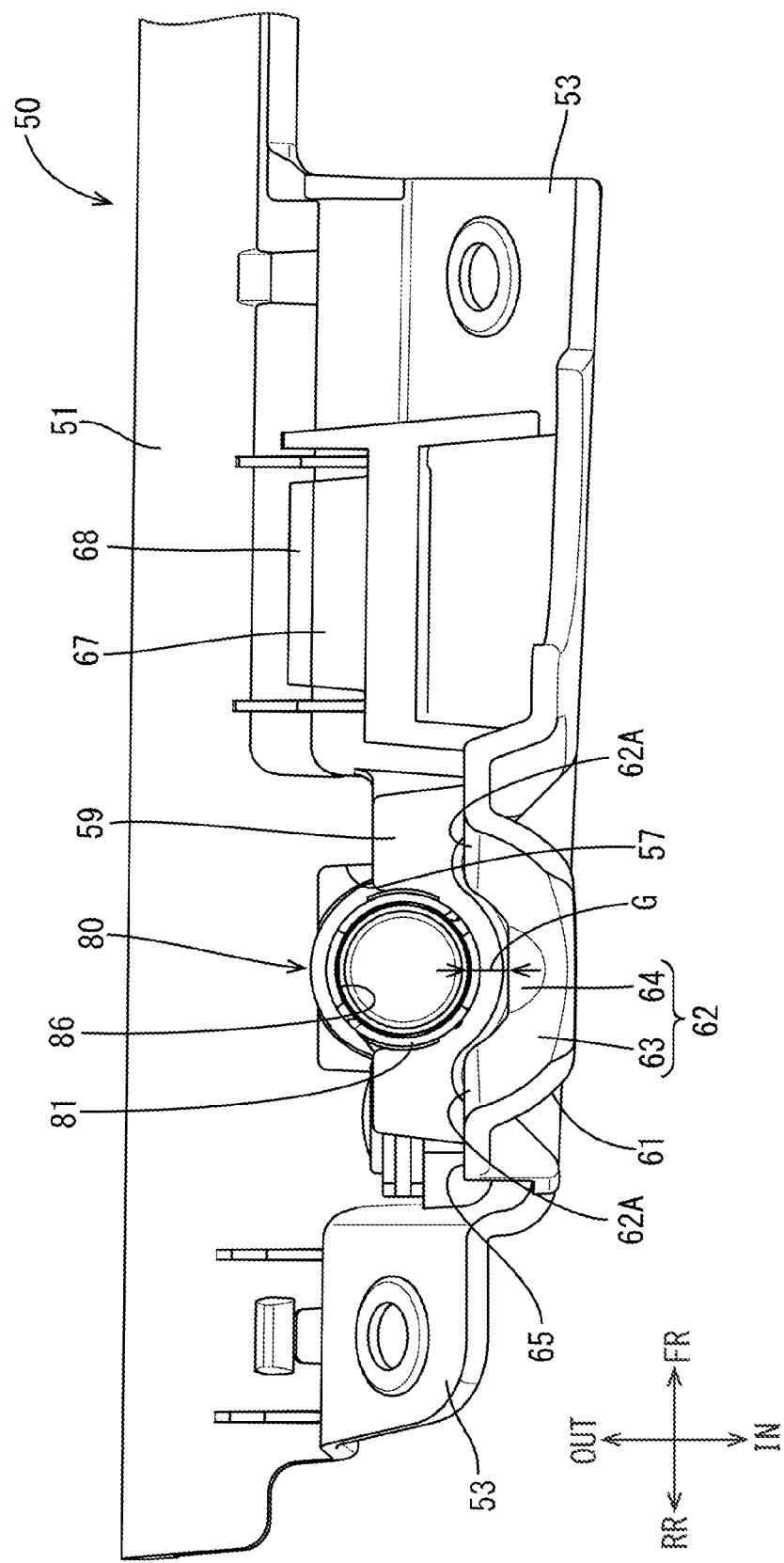
FIG. 6 is a bottom view of the upper cover including the lock knob holder.

More in detail, the guide surface of the insertion guide portion 61 includes a curved guide portion 63. The curved guide portion 63 has a shape of a circular truncated cone cut along an axial direction thereof. The curved guide portion 63 is a plate member curved to project toward the side wall 21 of the upper board 20 (the vehicular interior side). As illustrated in FIG. 5, the insertion guide portion 61 is away from the insertion hole 86 of the lock knob holder 80 with respect to the axial direction of the lock knob holder 80. As illustrated in FIGS. 6 and 7, the insertion guide portion 61 is away from the insertion hole 86 of the lock knob holder 80 with respect to the radial direction of the lock knob holder 80.

As previously described, the bar-shaped door lock knob 71 is mounted in the tubular lock knob holder 80 with the stopper projections 74 of the arms 73, which project outwardly than the knob body 71A and extend upward, being fitted in the stopper holes 84 of the lock knob holder 80 from an outer side. In this embodiment, as illustrated in FIGS. 6 and 7, the guide surface 62 is disposed between the side wall 21 and the lock knob holder 80 and is on the vehicular interior side with respect to the insertion hole 86 of the lock knob holder 80 such that the arms 73 that project outward than the knob body 71A do not come into contact with the guide surface 62 of the insertion guide portion 61 at the time of mounting the door lock knob 71 in the lock knob holder 80.

The guide surface 62 includes the curved guide portion 63 that is a plate member curved to project toward the side wall 21 of the upper board 20 (the vehicular interior side). The guide surface 62 has a curved shape projecting toward the vehicular interior side. As illustrated in FIGS. 4 and 6, the guide surface 62 has two opposite edges 62A on two ends with respect to the front-rear direction. The two opposite edges 62A are on a same plane as a vehicular interior side hole edge of the insertion hole 86 with respect to the front-rear direction or are on a vehicular interior side with respect to the vehicular interior side hole edge.

As illustrated in FIG. 6, the guide surface 62 does not overlap the insertion hole 86 with respect to the front-rear direction. Specifically, the opposite edges 62A do not overlap the insertion hole 86 with respect to the front-rear direction. With such a configuration, when the top end portion of the door lock knob 71 is guided by the guide surface 62 and inserted in the insertion hole 86, the arms 73 that pass near the opposite edges 62A of the guide surface 62 do not hit the opposite edges 62A. Furthermore, a distance between the two opposite edges 62A increases as the curved guide portion 63 extends away from the insertion hole 86.

According to such a configuration, the top end portion of the door lock knob 71 can be guided along the guide surface 62 to the insertion hole 86 of the lock knob holder 80 with the arms 73 being not contacted with the guide surface 62.

With the guide surface extending until the opposite edges of the guide surface overlaps the insertion hole 86 to increase the dimension of the curved guide portion in the vehicular interior-exterior direction (vehicular width direction), the top end portion of the door lock knob 71 may be moved to the insertion hole 86 more surely. However, with the guide surface extends until the opposite edges of the guide surface overlap the insertion hole 86, the opposite edge portions of the guide surface obstruct the way of the arms 73 that move along the guide surface to the insertion hole 86 and the arms 73 hit the opposite edge portions.

Accordingly, the door lock knob 71 cannot be mounted in the lock knob holder 80 properly and smoothly.

As previously described, with the guide surface 62 of the insertion guide portion 61 being disposed between the side wall 21 and the lock knob holder 80 and is on the vehicular interior side with respect to the insertion hole 86 of the lock knob holder 80, the opposite edges 62A of the guide surface 62 are on the same plane as a vehicular interior side hole edge of the insertion hole 86 or are on the vehicular interior side with respect to the vehicular interior side hole edge. Therefore, as illustrated in FIG. 6, a gap G is created between the guide surface 62 and the insertion hole 86 with respect to the vehicular interior-exterior direction (vehicular width direction). Specifically, the gap G is created between the insertion hole 86 and a portion of the curved guide portion 63 that is a most vehicular interior side and closest to the insertion hole 86. If the gap G is large, the top end portion of the door lock knob 71 may hit a hole edge of the insertion hole 86 due to the large gap G just before the top end portion of the door lock knob 71 is inserted in the insertion hole 86 of the lock knob holder 80 and the top end portion of the door lock knob 71 may not be inserted in the insertion hole 86 smoothly.

In this embodiment, the guide surface 62 includes a flat guide portion 64. The flat guide portion 64 is a portion (an upper portion) of the guide surface 62 that is adjacent to the insertion hole 86 and a middle portion of the guide surface 62 with respect to the width direction thereof. The flat guide portion 64 is a portion of the guide surface 62 closest to the side wall 21. The flat guide portion 64 is flat and continuous to the curved guide portion 63 and becomes wider as it extends toward the hole edge of the insertion hole 86. The inclination angle of the flat guide portion 64 with respect to the lock knob holder 80 is determined such that a plan surface extending from the plate surface of the flat guide portion 64 includes or close to the tangent line of the hole edge of the insertion hole 86 of the lock knob holder 80.

With such a configuration, the top end portion of the door lock knob 71 is guided toward the insertion hole 86 by the curved guide portion 63 of the guide surface 62 and guided more upward by the flat guide portion 64 so as to be farther away from the side wall 21 and closer to the insertion hole 86 than being guided by the curved guide portion 63 just before being inserted in the insertion hole 86. The flat guide portion 64 has a function of a jump stand. The top end portion of the door lock knob 71 can be easily and smoothly moved to the insertion hole 86 even with the gap G, which may be large. Furthermore, the inclination angle of the flat guide portion 64 with respect to the lock knob holder 80 is determined such that a plan surface extending from the plate surface of the flat guide portion 64 includes or close to the tangent line of the hole edge of the insertion hole 86 of the lock knob holder 80. Therefore, the top end portion of the door lock knob 71 that is moved away from the flat guide portion 64 can be inserted in the insertion hole 86 of the lock knob holder 80 smoothly.

The upper cover 50 includes connection portions 66 that connect the insertion guide portion 61 and the cover body 51. As illustrated in FIG. 4, the insertion guide portion 61 includes flat portions 65 on two end portions with respect to the front-rear direction. The flat portions 65 extend along the side wall 21. The connection portions 66 extend from the extending portion 56 to the two end portions of the flat portions 65. The flat portions 65 are connected to the extending portion 56 via the connection portions 66 such that the insertion guide portion 61 is integrally connected to the cover body 51.

Next, operations and effects of this embodiment will be described. The door lock assembly 1 according to this embodiment includes the door trim 11, the locking device 70, and the insertion guide portion 61. The locking device 70 locks and unlocks the vehicular door 10. The locking device 70 includes the door lock knob 71 and the lock knob holder 80. The door lock knob 71 has a columnar bar shape and is movable between an unlocked position and a locked position with respect to the door trim 11 (the upper board 20). In the unlocked position, the door lock knob 71 projects from a vehicular interior side surface of the door trim 11 that is configured as a vehicular interior side surface of the vehicular door 10. In the locked position, the door lock knob 71 moves down from the unlocked position. The lock knob holder 80 has a tubular shape and is disposed on the vehicular exterior side with respect to the door trim 11. The door lock knob 71 is inserted in and held by the lock knob holder 80 so as to be movable inside the lock knob holder 80. The lock knob holder 80 has at least two holes at two ends and one of the two holes is the insertion hole 86. The door trim 11 (the upper board 20) includes the board-side through hole 24 through which the door lock knob 71 can pass. Another one of the two holes of the lock knob holder 80 is close to the board-side through hole 24 and the insertion hole 86 is on an opposite side from the board-side through hole 24. The insertion guide portion 61 is disposed adjacent to the insertion hole 86 and includes the guide surface 62 that increases its width as it extends away from the insertion hole 86.

According to the above configuration, when the door lock knob 71 having the columnar bar shape is inserted and mounted in the tubular lock knob holder 80, the top end portion of the door lock knob 71 can be guided toward the insertion hole 86 of the lock knob holder 80 by the insertion guide portion 61. Accordingly, the mounting operation becomes easy.

The upper board 20 includes the side wall 21 that is configured as the vehicular interior side surface of the vehicular door 10 and the upper wall 23 that extends toward the vehicular exterior side from the upper end of the side wall 21. The board-side through hole 24 is in the upper wall 23. The lock knob holder 80 is disposed to extend along the side wall 21 with being away from the side wall 21. The guide surface 62 of the insertion guide portion 61 is on the vehicular interior side with respect to the insertion hole 86 of the lock knob holder 80.

The columnar bar-shaped door lock knob 71 includes the two arms 73 that project outward from the knob body 71A and are opposite each other. With the stopper projections 74 of the arms 73 being fitted in the stopper holes 84 in the lock knob holder 80, the arms 73 project outward than the tubular lock knob holder 80 and the columnar bar-shaped door lock knob 71 is held by the tubular lock knob holder 80. With the door lock knob 71 including the arms 73 that project outward from the knob body 71A, the arms 73 may be contacted with the guide surface 62 of the insertion guide portion 61 at the time of mounting the door lock knob 71 in the lock knob holder 80. However, with the arms 73 being included in the door lock knob 71 so as not to face the guide surface 62, the arms 73 do not come in contact with the guide surface 62. Accordingly, the mounting operation is performed smoothly.

The guide surface 62 of the insertion guide portion 61 includes the curved guide portion 63 and the flat guide portion 64. The curved guide portion 63 has a shape of a circular truncated cone cut along the axial direction and has a curved surface. The flat guide portion 64 is adjacent to the insertion hole 86 and continuous from the curved guide portion 63. The flat guide portion 64 has a flat surface having a width that increases toward the insertion hole 86.

When the door lock knob 71 is mounted in the lock knob holder 80, the top end portion of the door lock knob 71 is guided by the guide surface 62 and approaches the insertion hole 86 of the lock knob holder 80. As previously described, with the guide surface 62 of the insertion guide portion 61 being disposed on the vehicular interior side with respect to the insertion hole 86, the gap G is created between the guide surface 62 and the insertion hole 86 with respect to the vehicular interior-exterior direction (vehicular width direction). Specifically, the gap G is created between the insertion hole 86 and a portion of the curved guide portion 63 that is a most vehicular interior side and closest to the insertion hole 86. With such a configuration, the top end portion of the door lock knob 71 may hit the hole edge of the insertion hole 86 due to the gap G, which may be large, just before the top end portion of the door lock knob 71 is inserted in the insertion hole 86 and the top end portion of the door lock knob 71 may not be inserted in the insertion hole 86 smoothly.

With the above configuration, the top end portion of the door lock knob 71 is guided toward the insertion hole 86 by the curved guide portion 63 of the guide surface 62 and then guided upward by the flat guide portion 64 so as to be farther away from the side wall 21 and closer to the insertion hole 86 and farther away from the side wall 21 just before being inserted in the insertion hole 86. The top end portion of the door lock knob 71 can be easily and smoothly moved to the insertion hole 86 even with the gap G, which is large. The flat guide portion 64 has a function of a jump stand and the insertion operation can be performed more effectively.

The vehicular door 10 includes the weather strip 19 for waterproofing between the side window 12 and the upper board 20 with respect to the vehicular interior-exterior direction. The upper board 20 is fixed to the weather strip 19 via the upper cover 50 that is disposed on the vehicular exterior side with respect to the upper board 20. The lock knob holder 80 is supported by the support bases 59, which project toward the vehicular exterior side from the upper cover 50, from the upper board 20 side with being away from the side wall 21. The insertion guide portion 61 is integrally included in the upper cover 50.

According to the above configuration, with using the upper cover 50 for fixing the upper board 20 to the weather strip 19, the lock knob holder 80 can be positioned to be away from the side wall 21 and the insertion guide portion 61 can be integrally included in the upper cover 50. This reduces the number of components compared to the configuration including separate members for the respective components.

Other Embodiments

The technology described herein is not limited to the embodiments described above with reference to the drawings. The following embodiments may be included in the technical scope. The technology described herein may be modified within the technical scope.

(1) In the above embodiment, the insertion guide portion 61 is integrally included in the upper cover 50. However, the insertion guide portion may be included as a separate component.

(2) The insertion guide portion may be integrally included with a component other than the upper cover, for example, a reinforcement member.

(3) If the door lock knob does not include a projection that projects outward from the knob body, the insertion guide portion may be disposed such that the guide surface of the insertion guide portion is on a same plane to be continuous to the hole edge of the insertion hole of the lock knob holder.

(4) The guide surface of the insertion guide portion may not include the flat guide portion.

The invention claimed is:

1. A door lock assembly comprising:
a door trim including a through hole;
a locking device that is disposed on a vehicular exterior side with respect to the door trim and locks and unlocks a vehicular door, the locking device including
a lock knob holder having a tubular shape and having two holes at two opposite ends, one of the two holes being adjacent to the through hole and another one of the two holes being an insertion hole, and
a door lock knob having a bar shape and disposed in the lock knob holder so as to be movable between an unlocked position at which the door lock knob projects upward from a vehicular interior side surface of the door trim through the through hole and a locked position at which the door lock knob is positioned lower than the unlocked position; and
an insertion guide portion disposed adjacent to the insertion hole and including a guide surface having a width that increases as it extends away from the insertion hole, wherein
the guide surface of the insertion guide portion includes a curved guide portion and a flat guide portion,
the curved guide portion has a shape of a circular truncated cone cut along an axial direction and has a curved surface,
the flat guide portion is flat and adjacent to the insertion hole and continuous from the curved guide portion and has a width that increases in a vehicular front-rear direction as the flat guide portion extends toward the insertion hole, and
an axis of the flat portion is tilted relative to a longitudinal axis of the locking device.

2. The door lock assembly according to claim 1, wherein,
the door trim includes an upper board that is disposed adjacent to a window of the vehicular door,
the upper board includes a side wall that is configured as the vehicular interior side surface of the vehicular door and an upper wall that extends toward the vehicular exterior side from an upper edge of the side wall,
the through hole is included in the upper wall,
the lock knob holder extends along the side wall and is away from the side wall, and
the guide surface of the insertion guide portion is disposed between the side wall and the lock knob holder and is on a vehicular interior side with respect to the insertion hole of the lock knob holder.

3. The door lock assembly according to claim 2, further comprising an intervening member disposed on the vehicular exterior side with respect to the upper board, the intervening member integrally including the insertion guide portion, and the intervening member including
a body, and
a holder support base that projects toward the vehicular exterior side from the body and supports the lock knob holder from an upper board side to be away from the side wall.

4. The door lock assembly according to claim 1, wherein
the lock knob holder extends in an upper-bottom direction and includes the one of the two holes on an upper end and the insertion hole on a lower end and the insertion hole opens downward, and
the guide surface does not overlap the insertion hole with respect to the vehicular front-rear direction.

5. The door lock assembly according to claim 1, wherein
the insertion guide portion is between the lock knob holder and the door trim, and
the guide surface of the insertion guide portion includes a curved guide portion that is a plate member curved to project toward the door trim.

6. The door lock assembly according to claim 5, wherein
the guide surface further includes a flat guide portion, and
the flat guide portion is flat and adjacent to the insertion hole and continuous from the curved guide portion and has a width that increases toward the insertion hole.

7. The door lock assembly according to claim 5, wherein
the curved guide portion has two opposite edges that are opposite each other with respect to the vehicular front-rear direction, and
a distance between the two opposite edges increases as the curved guide portion extends away from the insertion hole.

8. The door lock assembly according to claim 7, wherein
the guide surface further includes a flat guide portion, and
the flat guide portion is flat and adjacent to the insertion hole and continuous from the curved guide portion and the flat guide portion has a width that increases toward the insertion hole.

9. The door lock assembly according to claim 7, wherein
the lock knob holder extends in an upper-bottom direction and includes the one of the two holes on an upper end and the insertion hole on a lower end,
the insertion hole opens downward, and
the two opposite edges do not overlap the insertion hole with respect to the vehicular front-rear direction.

10. The door lock assembly according to claim 7, wherein
the lock knob holder extends in an upper-bottom direction and includes the one of the two holes on an upper end and the insertion hole on a lower end,
the insertion hole opens downward, and
the two opposite edges are on a same plane as a vehicular interior side hole edge of the insertion hole with respect to the vehicular front-rear direction or are on a vehicular interior side with respect to the vehicular interior side hole edge.

11. The door lock assembly according to claim 1, wherein
the guide surface is inclined so as to approach the insertion hole as the guide surface extends upward.

12. The door lock assembly according to claim 2, wherein
the guide surface of the insertion guide portion includes a curved guide portion that is a plate member curved to project toward the door trim,
the curved guide portion has two opposite edges that are opposite each other with respect to the vehicular front-rear direction, and
a distance between the two opposite edges increases as the curved guide portion extends away from the insertion hole.

* * * * *